United States Patent
Epp et al.

(10) Patent No.: US 11,886,755 B2
(45) Date of Patent: Jan. 30, 2024

(54) METHOD OF PREPARING A PRINT JOB FOR THE PRINTING OPERATION

(71) Applicant: Heidelberger Druckmaschinen AG, Heidelberg (DE)

(72) Inventors: Sascha Epp, Sinsheim-Eschelbach (DE); Nick Trabold, Wiesloch (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 0 days.

(21) Appl. No.: 17/903,220

(22) Filed: Sep. 6, 2022

(65) Prior Publication Data

US 2023/0070717 A1 Mar. 9, 2023

(30) Foreign Application Priority Data

Sep. 8, 2021 (DE) .................. 10 2021 123 203.1

(51) Int. Cl.
*G06F 3/12* (2006.01)

(52) U.S. Cl.
CPC .......... *G06F 3/1204* (2013.01); *G06F 3/1257* (2013.01)

(58) Field of Classification Search
None
See application file for complete search history.

(56) References Cited

U.S. PATENT DOCUMENTS

| | | | |
|---|---|---|---|
| 8,009,302 B2 | 8/2011 | Martin | |
| 8,253,971 B2 | 8/2012 | Von Spreckelsen et al. | |
| 8,867,207 B2 | 4/2014 | Berti et al. | |
| 2002/0159084 A1 | 10/2002 | Daniels et al. | |
| 2005/0028700 A1 | 2/2005 | Hauck | |
| 2017/0003923 A1* | 1/2017 | Hane | H04N 1/00411 |
| 2022/0303399 A1* | 9/2022 | Anno | G06F 3/1275 |

FOREIGN PATENT DOCUMENTS

| | | |
|---|---|---|
| DE | 20305642 U1 | 9/2003 |
| DE | 10339571 A1 | 3/2004 |
| DE | 102005050538 A1 | 5/2007 |
| DE | 102007009968 A1 | 10/2007 |
| DE | 102020111192 A1 | 10/2021 |
| EP | 0649744 A1 | 4/1995 |
| JP | 2003127333 A | 5/2003 |
| JP | 2009271922 A | 11/2009 |
| JP | 2017016315 A | 1/2017 |

* cited by examiner

*Primary Examiner* — Frantz Bataille

(74) *Attorney, Agent, or Firm* — Laurence A. Greenberg; Werner H. Stemer; Ralph E. Locher

(57) ABSTRACT

A method prepares a print job for a printing operation and includes providing at least one first data set associated with the print job and multiple reference data sets associated with reference jobs. The method is characterized in that it contains the steps of providing multiple mutually complementary data sets for each one of a plurality of reference jobs, automatically filtering the reference data sets of the plurality of reference jobs to provide at least one second data set, and using the second data set in the printing operation as a replacement of or an addition to the at least one first data set. The method provides a way of manufacturing high-quality printed products while saving time, e.g. makeready time for the printing operation, and costs, e.g. caused by unusable prints or low-quality prints.

11 Claims, 2 Drawing Sheets

METHOD OF PREPARING A PRINT JOB FOR THE PRINTING OPERATION

CROSS-REFERENCE TO RELATED APPLICATION

This application claims the priority, under 35 U.S.C. § 119, of German Patent Application DE 10 2021 123 203.1, filed Sep. 8, 2021; the prior application is herewith incorporated by reference in its entirety.

FIELD AND BACKGROUND OF THE INVENTION

The invention relates to a method of preparing a print job for the printing operation.

The technical field of the invention is the field of the graphic industry and in particular the field of preparing the printing operation, in particular of preparing print jobs and providing digital data for print jobs, for instance in offset or inkjet printing.

The provision of digital data for print jobs is known in the art.

Published, non-prosecuted German patent application DE 10339571 A1 discloses a method of determining the optimum way to proceed for changes on a machine for processing printing substrates including at least one control unit. The method is characterized in that the control unit compares the data of a first machine job with the data of a subsequent machine job and, based on the comparison, creates a succession of tasks that need to be carried out to complete the job change. Such a method is known under the trade name "Intellistart" for printing presses manufactured by Heidelberger Druckmaschinen AG.

Published, non-prosecuted German patent application DE 10 2007 009 968 A1 discloses production autocontrol, i.e. a method of operating a machine, for instance a printing press, with a computer, wherein at least one job implemented on the machine to create a printed product may be saved on the computer. Parameters for the makeready of the machine are saved as sets of parameters in what are known as templates. They refer to one or more production steps. For a job-specific adaptation, the settings in the templates need to be modified. Settings that have not been tried and tested may result in a loss of quality. Moreover, only highly-trained staff are capable of making the settings on the machine. To improve quality and enable lesser qualified staff to operate the machine, the document suggests comparing a set of parameters based on broad input data with templates and to use the template that is most similar to set up the production step(s). Materials the templates may factor in are, for instance printing plates, papers for the printing operation, or inks for the printing operation. To be able to process print jobs for which no matching template, i.e. no similar template, was found, a further development suggests generating a message if there is a process step or which no template can be found.

Many print shops, for instance in packaging printing, have a number of jobs that they do again and again (repeat orders), i.e. print jobs which are printed again without any or with just minimal changes. An example of a change to a print job is, the addition of another color, for instance a star including light blue for a winter edition. Thus, all other settings for the print job remain the same.

In packaging printing, the proportion of repeat orders is frequently well above 70%. However, print shops will start these jobs from scratch every time using "raw data". This is mostly due to the amount of work involved in manually linking existing data with the new job information (new job number for accounting) to form new jobs. In many cases, only parts of jobs are required because there may be minimal changes to the previous job.

Another aspect is that print shops often do not have the necessary know-how to find the quickest solution to the problem of keeping the same settings for repeat orders, which means that in most cases, the operator starts from scratch, hazarding the risk of more unusable prints and longer makeready times.

In most cases, there is no chance of reproducing gang run print jobs, which are reassembled for every print, i.e. change in terms of content and therefore cannot be reproduced without modification, in an automated way on the basis of existing information. For this type of production, the machine needs to be made ready for the job from scratch every time, which is a time-consuming and wasteful process.

SUMMARY OF THE INVENTION

An object of the present invention is to provide an improvement over the prior art, in particular an improvement which provides a way of manufacturing high-quality printed products and at the same time saving time, for instance makeready time for the printing operation, and costs, for instance by reducing waste or low-quality prints.

In accordance with the invention, this object is attained by a method in accordance with the independent method claim.

Advantageous and thus preferred further developments of the invention will become apparent from the dependent claims as well as from the description and drawings.

A method of preparing a print job for a printing operation contains the step of providing at least one first data set associated with the print job and multiple reference data sets associated with reference jobs. The method is characterized in that the step of providing includes providing multiple mutually complementary data sets for each one of a plurality of reference jobs and in that the method further includes the steps of automatically filtering the reference data sets of the plurality of reference jobs to provide a second data set, and using the second data set in the printing operation as a replacement of or an addition to the at least one first data set.

Advantageous Embodiments and Effects of the Invention

The invention advantageously provides a way of manufacturing high-quality printed products and saving both time, e.g. makeready time for the printing operation, and costs, e.g. costs caused by unusable prints or quality flaws in the print at the same time.

For instance, the invention may provide automated assistance for what are referred to as repeat orders and thus optimum reproducibility of repeat orders.

In addition, the invention provides a way of automatically saving print jobs, yet preferably not as a complete job but rather subdivided into various elements which are saved separately. Thus, it becomes possible to add saved elements to a new print job at a later time. Moreover, it may become possible to add further parameters and information to a saved print job or to the elements thereof, which means that at a later point, it is possible to make a detailed comparison with a new print job/a new production and to find out in the process whether the earlier production may be achieved at the same quality. When a file is saved again, preferably in connection with an ID or job name, there is also a possibility to overwrite only parts of the pre-saved data, for instance, to overwrite only the paper path for the feeder rather than the entire paper path for a printing substrate. Examples for added information will be indicated below.

An essential difference to the prior art may be that it is not an operator who needs to find the saved job that is the best match and best reference for a new print job on the basis of criteria, but the method itself which uses the filtering step to complete this task whereas the operator only needs to deselect or add individual job parts, for example.

The print job is provided in digital form, preferably on a digital computer of a printing machine or print shop or on a cloud computer.

The first data set preferably contains an ID, e.g. a job ID. The first data set contains at least one job content, for instance data to be printed, data about a printing plate, about a blanket, or about a printing ink (and/or varnish), about a printing substrate and/or about a dampening fluid.

What is known as a fingerprint may be generated for the first data set to be subsequently used in the step of filtering/comparing. The fingerprint is digital and is created digitally/by a digital computer. The fingerprint for the first data set is unique. The fingerprint is preferably saved together with or in connection with the first data set. Digital methods of generating and saving fingerprints are known in the art; any such method may be used in this context.

The reference jobs may stem from earlier print jobs, preferably ones that have already been completed. Such print jobs may have been printed on the same printing machine or on a different printing machine of a group of machines. The group of printing machines may include printing machines of a print shop and/or printing machines which have been produced by the same manufacturer and supply data to the manufacturer via a cloud. The reference jobs, i.e. the data thereof, are preferably saved in digital form, for instance in the memory of a digital computer of a printing machine or of a print shop or in a cloud memory.

Each reference job preferably includes an ID, e.g. a job ID. The reference jobs comprise at least one job content, e.g. data to be printed, data about a printing plate, about a blanket, about a printing ink (and/or varnish), about a printing substrate, and/or about a dampening fluid.

In accordance with the invention, multiple and mutually complementary reference data sets are provided for each one of the plurality of reference jobs. Each one of the multiple and mutually complementary reference jobs preferably contains the ID, e.g. the job ID. Each one of the multiple and mutually complementary reference data sets contains at least one job content, e.g. data to be printed, data about a printing plate, about a blanket, about a printing ink (and/or varnish), about a printing substrate, and/or about a dampening fluid. For instance, a reference data set of a respective reference job contains data about a printing plate and another reference data set of the respective reference job contains data about a printing ink.

"Complementary" is understood to mean that the reference data sets of a respective reference job combined form an essentially complete data set for the printing operation of the reference job, or that the reference data sets of a respective reference job complement one another to form a data set which may be used for the printing operation.

Like for the first data set, what is known as a fingerprint may be created for every reference data set for future use in the step of filtering/comparing. The fingerprint for the reference data set is unique. The fingerprint is preferably saved together with or in combination with the reference data set.

An advantage of the automatic filtering step, which provides at least a second data set based on the reference data set of the plurality of reference jobs, is that data may be made available and utilized in an automated way and there is no need for the data to be collected in a time-consuming manual process.

An advantage of using the second data set—as a replacement of or in addition to the at least one first data set—for the printing operation is that available data may be used and time is saved.

Specific Examples of Adding Information

The addition of information in the saving operation preferably includes factors which have an influence on the job, e.g. on the print image, such as:
color and measurement system,
    name of the colors,
    target values,
    dot gain,
    trapping,
    slurring and/or ghosting,
    batch,
    amount of ink, e.g. fountain roller adjustment and ink key setting in relation to area coverage,
    ink fountain foil condition,
    inking roller age,
paper
    paper type,
    paper white,
    batch,
dampening fluid
    amount of dampening fluid,
    dampening fluid values,
    guide value,
    pH value,
    alcohol; amount of alcohol,
blanket
    age,
    type,
printing plate
    batch,
    type,
    quality information from prepress system,
varnish
    varnish type,
    roller type,
    gloss created by application of varnish,
    dryer settings, and
    Further quality factors and machine settings which may arise over the entire production chain and may have an influence on the printed sheet in terms of its quality and appearance.

The aforementioned values may be obtained by means of:
sensors,
measuring systems,
central data interface or central data/job management system,
manual inputs on the printing machine,
terminals in the workflow system, e.g. a separate computer on the printing machine or in a storage area,
scanners, e.g. optical ones with 1D or 2D code, and
radio frequency identification devices (RFID).

The individual values may be saved in connection with one or more of the following IDs:
job ID,
work process ID (work process key), product ID,
job name ID,
customer ID, and
product ID.

Further Developments of the Invention

The following paragraphs describe preferred further developments of the invention (in short: further developments).

A further development of the invention may be characterized in that multiple mutually complementary first data sets associated with the print job are provided and in that the second data set is used in the printing operation as a replacement of or an addition to one of the first data sets. Each one of the multiple and mutually complementary data sets preferably include the ID, e.g. the job ID. Each one of the multiple and mutually complementary data sets preferably contains at least one job content, e.g. data to be printed, data about a printing plate, about a blanket, about a printing ink (and/or varnish), about a printing substrate, and/or about a dampening fluid. A first data set of the print job may for instance include data about a printing plate and a further first data set of the print job may include data about a printing ink.

A further development may be characterized in that the filtering step contains checking for a matching ID by comparing an ID of the print job to the ID of each one of the plurality of reference jobs and/or by comparing an ID of the at least one first data set to the IDs of each one the multiple reference data sets. The ID to be compared may be the job ID.

A further development of the invention may be characterized in that the filtering step contains checking for matching job contents by comparing a job content of the print job to the job contents of each one of the plurality of reference jobs and/or by comparing a job content of the at least one first data set to the job contents of each one of the multiple reference data sets. The job content to be compared may be data to be printed, data about a printing plate, about a blanket, about a printing ink (and/or varnish), about a printing substrate, and/or about a dampening fluid. The job contents may directly be compared to one another. In accordance with a preferred alternative feature, the fingerprints thereof may be compared to one another. The comparison may be made in such a way that identity of the job contents is determined. Alternatively, the comparison may be made in such a way that an essential match between the job contents is determined, i.e. a match between essential contents (contents defined as essential) or a match of all contents by more than 50%, 60%, 70%, 80%, or 90%. A step of filtering for job content matches may for instance be carried out when a step of filtering for ID matches came back without any result. Thus, an initial attempt may be made to quickly find a matching job via the ID; only if this is unsuccessful, the contents may be analyzed.

A further development may be characterized in that the print job is amended by a third data set containing job content for an additional print color or for job changes. The addition of a further color may be necessary if a spot color is to be added to a reference job, preferably without any other changes. Job changes are further changes, e.g. a change of the printing substrate.

A further development of the invention may be characterized in that the at least one second data set provided by the step of automatically filtering is automatically selected or selected by an operator making use of an option presented to the operator to make a selection. The automated selection may preferably be based on a fingerprint match found in the course of the comparison between the first data set and the reference data set.

A further development of the invention may be characterized in that the print job is prepared for a printing operation on a printing machine, in that measured data are generated by means of sensors and made available in the process, and in that computational reproduction control and/or quality control of the print job is achieved on the basis of the measured data. For instance, there may be a sensor which monitors the dampening fluid and/or its quality; the measurement data of the sensor may be used for a computational calculation or estimate of the attainable print quality. The result may be displayed to the operator or an operator may be alerted if a defined quality threshold is unattainable. If necessary, the operator may make changes to the first, second, and/or third data set. The operator may also make changes on the printing machine; in the example involving "dampening fluid", the operator may replace the dampening fluid.

A further development may be characterized in that an operator makes use of a modification option presented to the operator to make at least one modification to the first data set and/or to the second data set and/or to the third data set and in that the modification is saved as a modified or new reference data set.

Any desired combination of the features and combinations of features disclosed in the above sections on the technical field, invention, and further developments as well as in the section below on exemplary embodiments likewise represents an advantageous further developments of the invention.

Other features which are considered as characteristic for the invention are set forth in the appended claims.

Although the invention is illustrated and described herein as embodied in a method of preparing a print job for the printing operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the figures, corresponding features have the same reference symbols. Repetitive reference symbols have sometimes been left out for reasons of visibility.

Figure 1:
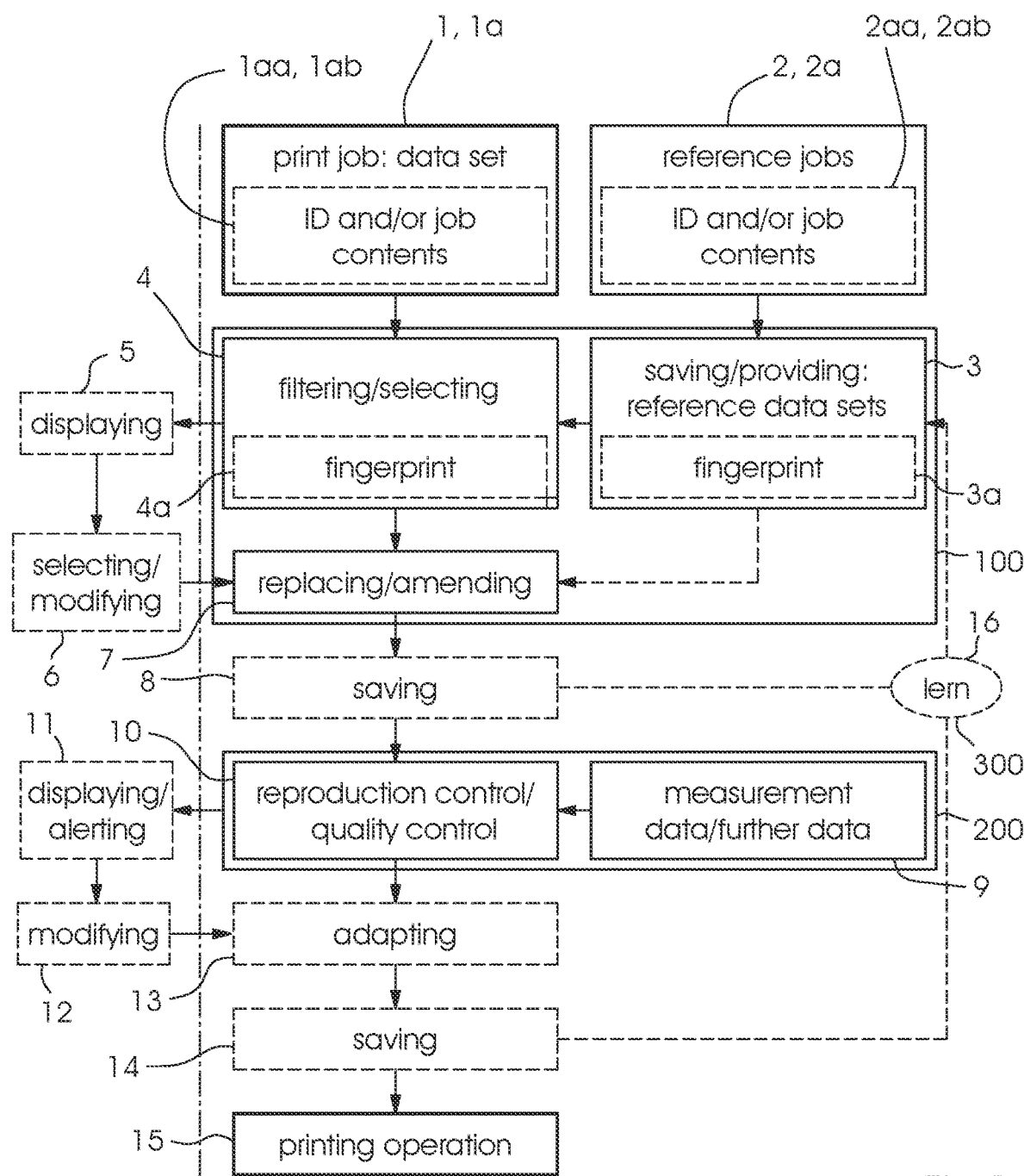
FIGS. 1 and 2 are illustrations showing preferred exemplary embodiments of the invention.

Referring now to the figures of the drawings in detail and first, particularly to FIG. 1 thereof, there is shown a preferred exemplary embodiment of a method of the invention of preparing a print job for the printing operation. To carry out the method, at least one digital computer (steps 1 to 14 and step 16), preferably with a display, and a printing machine (step 15), preferably an offset printing machine or an ink printing machine may be provided. For the printing operation, a printing substrate in the form of a web or sheet of paper, cardboard, or plastic foil may be provided.

The illustrated method preferably contains the now described steps.

Step 1: providing at least one first data set associated with the print job. The first data set preferably contains an ID 1aa, for instance a job ID. The first data set contains at least one job content 1ab, e.g. data to be printed, data about a printing plate, about a blanket, about a printing ink (and/or varnish), about a printing substrate and/or about a dampening fluid. Potentially, multiple first data sets complementing one another—and associated with the print job—may be provided. Preferably, a fingerprint (s. optional step part 4a) may be generated.

Step 2: providing multiple reference jobs. Each one of the reference jobs preferably contains an ID 2aa, e.g. a job ID. The reference jobs include at least one job content 2ab: e.g. data to be printed, data about a printing plate, about a blanket, about a printing ink (and/or varnish), about a printing substrate and/or about a dampening fluid.

Step 3: (saving and) providing multiple reference data sets associated with the respective reference jobs. In accordance with the invention, multiple and mutually complementary reference data sets are provided for the plurality of reference jobs. Each one of the multiple and mutually complementary reference data sets preferably contains the ID 2a, e.g. the job ID. Each one of the multiple and mutually complementary reference data sets contains at least one job content 2ab, for instance data to be printed, data about a printing plate, about a blanket, about a printing ink (and/or varnish), about a printing substrate and/or about a dampening fluid. For instance, one reference data set of a reference job contains data about a printing plate and another reference data set of the same reference job contains data about a printing ink. Preferably, a fingerprint may be created in an optional step part 3a.

Step 4: implementing an automated filtering step which involves providing at least one second data set of the reference data sets of the plurality of reference jobs and using the second data set—as a replacement of or in addition to a first data set (see step 7)—for the printing operation (see step 15). The filtering step may preferably include checking for matches with an ID by comparing an ID of the print job with the IDs of the plurality of reference jobs and/or by comparing an ID of the at least one first data set with a respective ID of the multiple reference data sets. The filtering step may preferably include checking for matches with job content by comparing a job content of the print job with the job contents of the plurality of reference jobs and/or by comparing a job content of the at least one first data set with the job contents of the multiple reference data sets. Alternatively and preferably, the fingerprints generated in optional step parts 3a and 4a may be compared to one another. The method may include automatically selecting the at least one second data set provided in the automated filtering step or presenting an option for selection to an operator to select the at least one second data set (see steps 5 and 6).

Step 5 (optional, in preparation of Step 6): Displaying the second data set which has been filtered/provided in an automated way (either in full or in an operator-friendly reduced form) and/or the ID thereof.

Step 6 (optional): selection and/or modification by the operator of the second data set that has been filtered/provided in an automated way. In this process, the operator may make selections or modifications in such a way that the print job is amended with a third data set, which may for instance include job content for an additional print color or for job changes.

Step 7: replacing or amending the first data set and/or the second data set and/or the third data set (see Step 6).

Step 8 (optional): saving the replaced or amended first, second, and/or third data set. The data set is preferably saved as a reference data set of a reference print job to make it available and usable for future print jobs. Thus, the system "learns" (see Step 16). It is possible to present an operator with a modification option (see steps 6 and 7) to make at least one modification to the first data set and/or to the second data set and/or to the third data set and to save the modifications as a modified reference data set or as a new reference data set.

Steps 9 and 10: providing measured data. In these steps, sensors generate and provide measurement data on the printing machine and computational reproduction control and/or quality control of the print job is implemented on the basis of the measured data. Step 9 (in connection with step 10 and optional steps 11 to 14) is preferably non-optional, because this step results in further advantages in terms of print quality; as a less preferred alternative, step 9 (and steps 10 to 14) may be skipped, for instance if the method is implemented on a printing machine that does not have the required sensor system.

Steps 11 to 14 (optional): similar to steps 5 to 8, data sets may be displayed, in particular a warning may be output, and data sets may be modified, adapted, and saved.

Step 15: printing the print job on a printing machine. This process preferably uses the second data set, which may correspond to the first data set (if no modifications have been made) or may differ from the first data set (if modifications have been made) and/or may be amended by the third data set.

Step 16 (optional): Learning by saving a substitution or modification of the first data set and/or of the second data set and/or of the third data set as a modified or new reference data set. Such reference data sets may be made available to the printing machine for future print jobs. In a similar way, such reference jobs may be made available to other printing machines in a group for future print jobs. The group of printing machines may comprise the printing machines of a print shop and/or the printing machines of a manufacturer which supply data to the manufacturer via a cloud. Learning may occur on four levels: on the level of a printing machine and/or on the level of multiple printing machines in a print shop and/or on the level of multiple printing machines produced by the same manufacturer and connected to the cloud.

Figure 2:
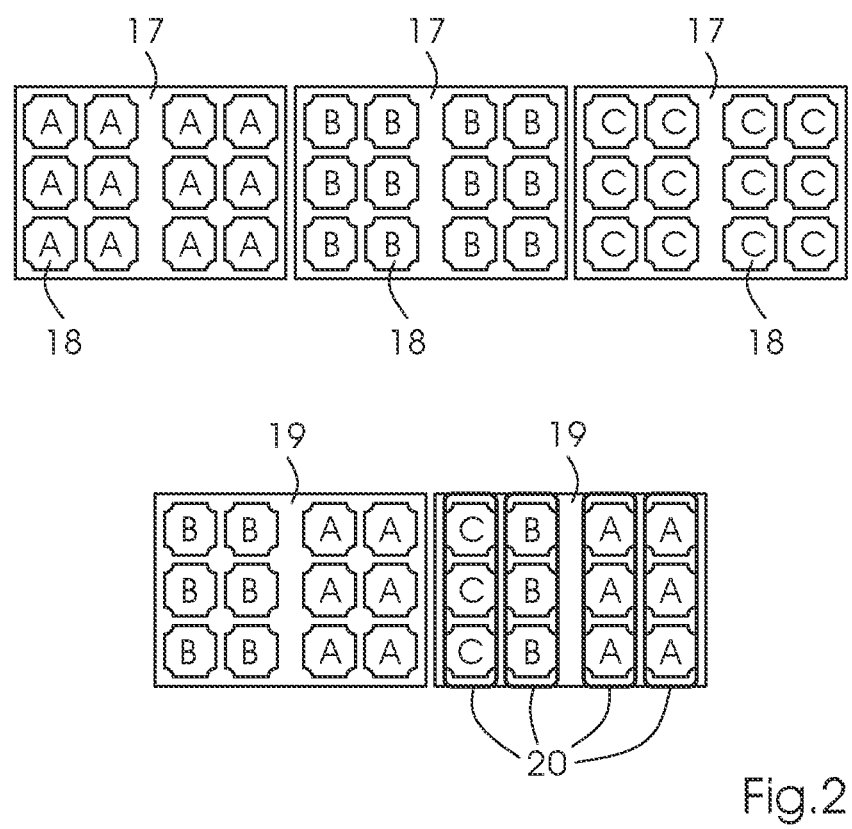

The upper part of FIG. 2 illustrates an example of three different print jobs 17, each of which contains multiple copies or rows of copies 18, e.g. "AAAA", "BBBB", and "CCCC". Copies A, B, and C may be different labels.

The lower part of FIG. 2 illustrates an example of two different collective jobs 19, each of which contains multiple copies or rows of copies 18, e.g. "BBAA" and "CBAA". Again, the copies may be different labels.

The examples shown in FIG. 2 are intended to illustrate the fact that it may make sense not to save complete jobs such as AAAA and BBBB, but individual rows of copies A and B thereof. Thus, new collective jobs, e.g. BBAA, may quickly be created on the basis of the saved rows of copies.

The following is a summary list of reference numerals and the corresponding structure used in the above description of the invention:

1 providing print job/first data set
1a first data set/first data sets
1aa ID of a first data set
1ab job content of a first data set
2 providing reference jobs/reference data sets, in particular a second data set
2a reference data sets, in particular second data set/second data sets
2aa ID of a reference data set, in particular of the second data set
2ab job content of a reference data set, in particular of the second data set
3 saving/providing reference data sets
3a generating a fingerprint (optional)
4 filtering/selecting
4a generating a fingerprint (optional)
5 displaying (optional)
6 selecting/modifying (optional), in particular amending with a third data set
7 substituting/amending
8 saving (optional)
9 providing sensor data and/or further data
10 reproduction control/quality control
11 displaying and/or warning (optional)
12 modifying (optional)
13 adapting the print job (optional)
14 saving (optional)
15 printing the print job
16 learning
17 print jobs
18 copies/rows of copies
19 collective job
20 copy/row of copies
100 using saved reference data sets
200 improving the saved reference data sets
300 using sensor data and/or further data

The invention claimed is:

1. A method of preparing a print job for a printing operation, which comprises the steps of:
providing at least one first data set associated with the print job and multiple reference data sets associated with a plurality of reference jobs, wherein the providing step contains the sub-step of providing multiple mutually complementary data sets as the multiple reference data sets for each one of the plurality of reference jobs;
with a digital computer, digitally creating a unique fingerprint for the first data set and digitally creating a unique fingerprint for each one of the multiple reference data sets;
saving the fingerprint for the first data set together with the first data set or in connection with the first data set;
for each respective one of the multiple reference data sets, saving the fingerprint for the respective one of the multiple reference data sets together with the respective one of the multiple reference data sets or in combination with the respective one of the multiple reference data sets;
automatically filtering the multiple reference data sets of the plurality of reference jobs to provide a second data set, wherein the step of automatically filtering uses the fingerprint generated for the first data set and the fingerprints generated for the multiple reference data sets; and
using the second data set in the printing operation as a replacement of or an addition to the at least one first data set;
wherein the multiple reference data sets stem from earlier print jobs printed on a same printing machine or on different printing machines of a group of machines; and
wherein complementary in the providing step means that the multiple reference data sets associated with a respective reference job combine to form an essentially complete data set for a printing operation of the respective reference job, or complementary in the providing step means that that the multiple reference data sets associated with the respective reference job complement one another to form a data set used for the printing operation.

2. The method according to claim 1, which further comprises:
providing multiple mutually complementary first data sets associated with the print job; and
using the second data set in the printing operation as a replacement of or an addition to one of the first data sets.

3. The method according to claim 1, wherein the automatically filtering step further comprises the sub-step of:
checking for a matching ID by comparing an ID of the print job to IDs of each one of the plurality of reference jobs and/or by comparing an ID of the at least one first data set to the IDs of each one the multiple reference data sets.

4. The method according to claim 1, wherein the filtering step further comprises the sub-steps of:
checking for matching job contents by comparing a job content of the print job to job contents of each one the plurality of reference jobs and/or by comparing a job content of the at least one first data set to job contents of each one of the multiple reference data sets.

5. The method according to claim 1, wherein the print job is amended by a third data set containing job content for an additional print color or for job changes.

6. The method according to claim 1, wherein the second data set provided by the step of automatically filtering is automatically selected or selected by an operator making use of an option presented to the operator to make a selection.

7. The method according to claim 1, which further comprises:
preparing the print job for the printing operation on a printing machine; and
generating measured data by means of sensors and made available in a process, and wherein computational reproduction control and/or quality control of the print job is achieved on a basis of the measured data.

8. The method according to claim 5, wherein an operator makes use of a modification option presented to the operator to make at least one modification to the at least one first data set and/or to the second data set and/or to the third data set and wherein the modification is saved as a modified or new reference data set.

9. The method according to claim 1, wherein the multiple reference data sets stem from earlier print jobs that have been completed.

10. A method of preparing a print job for a printing operation, which comprises the steps of:
providing at least one first data set associated with the print job and multiple reference data sets associated with a plurality of reference jobs, wherein the providing step contains the sub-step of providing multiple mutually complementary data sets as the multiple reference data sets for each one of the plurality of reference jobs;

with a digital computer, digitally creating a fingerprint for the first data set and digitally creating a fingerprint for each one of the multiple reference data sets;

automatically filtering the multiple reference data sets of the plurality of reference jobs to provide a second data set, wherein the step of automatically filtering uses the fingerprint generated for the first data set and the fingerprints generated for the multiple reference data sets; and using the second data set in the printing operation as a replacement of or an addition to the at least one first data set.

11. The method according to claim 10, wherein the multiple reference data sets stem from earlier print jobs that have been completed.

* * * * *